DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916 O.G. 1211

T916,001

PROCESS FOR PREPARING POLYESTER FABRICS HAVING DESIRABLE WETTING AND SOIL RELEASE PROPERTIES

John R. Schwier, Route 6, Kingsport, Tenn. 37660

Filed July 20, 1972, Ser. No. 273,566

Int. Cl. D06m *5/02*

U.S. Cl. 8—115.5

No Drawing. 7 Pages Specification

Disclosed is a process comprising contacting a polyester fabric with a composition comprising an alkali metal hydroxy compound and water so as to deposit on the surface of the fibers of the fabric at least 0.5 weight percent of the alkali metal hydroxy compound, based on the weight of the fabric, and heating the contacted fabric having at least 0.5 weight percent of the alkali metal hydroxy compound on the surface of the fibers of the fabric. The polyester fabric is contacted at a temperature in the range of 50° C. to 120° C. for a time in the range of 1 second to 30 minutes and the contacted fabric is heated at a temperature in the range of 80° C. to 200° C. for a period of time in the range of 5 seconds to 30 minutes. Poly(ethylene terephthalate) or poly(1,4-cyclohexylenedimethylene terephthalate) are preferred polyesters. The polyester fabrics treated in accordance with the process of the invention exhibit desirable wetting and soil release properties.